(12) United States Patent
Taylor et al.

(10) Patent No.: US 8,020,530 B2
(45) Date of Patent: Sep. 20, 2011

(54) PISTON AND INTERNAL COMBUSTION ENGINE THEREWITH AND METHOD OF CONSTRUCTING THE PISTON

(75) Inventors: Andy Taylor, Huddersfield (GB); Airton Martins, Granger, IN (US); Magnus Horn, Saro (SE); Claes Frennfelt, Torsianda (SE); John Durham, Derbyshire (GB); Derek Mackney, Derbyshire (GB); Sean McGrogan, North Wales, PA (US); Tian Tian, Winchester, MA (US); Victor Wong, Peabody, MA (US)

(73) Assignee: Federal-Mogul Corporation, Southfield, MI (US)

( * ) Notice: Subject to any disclaimer, the term of this patent is extended or adjusted under 35 U.S.C. 154(b) by 635 days.

(21) Appl. No.: 12/138,660

(22) Filed: Jun. 13, 2008

(65) Prior Publication Data

US 2009/0050101 A1    Feb. 26, 2009

Related U.S. Application Data

(60) Provisional application No. 60/944,244, filed on Jun. 15, 2007.

(51) Int. Cl.
*F02F 3/00* (2006.01)
(52) U.S. Cl. .................... 123/193.6; 29/888.04
(58) Field of Classification Search ............... 123/193.6; 92/208; 29/888.04
See application file for complete search history.

(56) References Cited

U.S. PATENT DOCUMENTS

| 1,523,572 | A |   | 1/1925  | Agard |
|-----------|---|---|---------|-------|
| 1,673,775 | A | * | 6/1928  | Moore ................... 123/193.6 |
| 1,710,011 | A |   | 4/1929  | Burnett |
| 2,662,517 | A |   | 12/1953 | Bodine |
| 2,827,033 | A |   | 3/1958  | Bodine, Jr. |
| 2,963,329 | A | * | 12/1960 | Scherenberg ................ 92/208 |
| 3,456,638 | A |   | 7/1969  | Bodine |
| 3,463,057 | A |   | 8/1969  | Packard et al. |
| 4,236,490 | A |   | 12/1980 | Correll |
| 4,471,734 | A |   | 9/1984  | Showalter |
| 4,566,413 | A |   | 1/1986  | Maly |
| 4,716,817 | A |   | 1/1988  | Ripberger et al. |
| 4,987,865 | A | * | 1/1991  | Schenkel ................... 123/193.6 |
| 5,083,536 | A |   | 1/1992  | Ariga |
| 6,189,500 | B1 |  | 2/2001  | Gyllenstedt |
| 6,557,514 | B1 |  | 5/2003  | Gaiser |
| 2005/0051128 | A1 | | 3/2005 | Kim |

FOREIGN PATENT DOCUMENTS

| DE | 648652    | 8/1967 |
| FR | 937548    | 7/1946 |
| GB | 1364508   | 8/1974 |
| KR | 1998045244 | 9/1998 |

* cited by examiner

*Primary Examiner* — M. McMahon
(74) *Attorney, Agent, or Firm* — Robert L. Stearns; Dickinson Wright, PLLC (57) ABSTRACT

A piston and internal combustion engine therewith constructed in accordance with the present invention has a piston body with an upper crown having a substantially cylindrical outer surface depending from a top surface along a central axis. At least one annular ring groove extends radially into the outer surface to provide a top land extending from the ring groove to the top surface. A plurality of waves are formed circumferentially about the top land. Each of the waves has a valley extending radially into the outer surface of the top land and extending from the top surface to the ring groove. The waves traverse from the top surface to the ring groove and are configured in substantially non-overlapping relation with one another and in a predetermined orientation relative to at least one of a fuel spray stream, a pin bore axis or a thrust axis of the piston.

29 Claims, 7 Drawing Sheets

FIG - 3    WAVY SHAPE FOR TOP LAND

FIG-4

FIG - 5 WAVY SHAPE FOR TOP LAND 5 POINTS

Wavy Top Land

| no. of peaks | 5 | 6 | 7 | 8 |
|---|---|---|---|---|
| maximum radial decrease | 0.500 | 0.500 | 0.500 | 0.500 |
| Angle (degree) | radial decrease (mm) | radial decrease (mm) | radial decrease (mm) | radial decrease (mm) |
| 0 | 0.0000 | 0.0000 | 0.0000 | 0.0000 |
| 5 | 0.0234 | 0.0335 | 0.0452 | 0.0585 |
| 10 | 0.0893 | 0.1250 | 0.1645 | 0.2066 |
| 15 | 0.1853 | 0.2500 | 0.3147 | 0.3750 |
| 20 | 0.2934 | 0.3750 | 0.4415 | 0.4849 |
| 22.5 | 0.3457 | 0.4268 | 0.4810 | 0.5000 |
| 25 | 0.3934 | 0.4665 | 0.4990 | 0.4849 |
| 25.74 | 0.4063 | 0.4755 | 0.5000 | 0.4749 |
| 30 | 0.4665 | 0.5000 | 0.4665 | 0.3750 |
| 35 | 0.4990 | 0.4665 | 0.3557 | 0.2066 |
| 36 | 0.5000 | 0.4523 | 0.3273 | 0.1727 |
| 409 | 0.4849 | 0.3750 | 0.2066 | 0.0585 |
| 45 | 0.4268 | 0.2500 | 0.0732 | 0.0000 |
| 50 | 0.3355 | 0.1250 | 0.0038 | 0.0585 |
| 51.48 | 0.3045 | 0.0931 | 0.0000 | 0.0955 |
| 55 | 0.2282 | 0.0335 | 0.0234 | 0.2066 |
| 60 | 0.1250 | 0.0000 | 0.1250 | 0.3750 |
| 65 | 0.0452 | 0.0335 | 0.2718 | 0.4849 |
| 67.5 | 0.0190 | 0.0732 | 0.3457 | 0.5000 |
| 70 | 0.0038 | 0.1250 | 0.4107 | 0.4849 |
| 72 | 0.0000 | 0.0000 | 0.4523 | 0.4523 |
| 75 | 0.0085 | 0.2500 | 0.4915 | 0.3750 |
| 77.28 | 0.0261 | 0.3091 | 0.5000 | 0.3009 |
| 80 | 0.0585 | 0.3750 | 0.4849 | 0.2066 |
| 85 | 0.1443 | 0.4665 | 0.3934 | 0.0585 |
| 90 | 0.2500 | 0.5000 | 0.2500 | 0.0000 |

FIG - 7

PISTON AND INTERNAL COMBUSTION ENGINE THEREWITH AND METHOD OF CONSTRUCTING THE PISTON

CROSS-REFERENCE TO RELATED APPLICATION

This application claims the benefit of U.S. Provisional Application Ser. No. 60/944,244, filed Jun. 15, 2007, which is incorporated herein by reference in its entirety.

BACKGROUND OF THE INVENTION

1. Technical Field

This invention relates generally to internal combustion engines, and more particularly to pistons constructions therefore and arrangements therein.

2. Related Art

It is known that internal combustion engines, and particularly diesel engines, consume relatively high amounts of oil, and in the process, produce undesirable exhaust emissions. In addition, with the oil consumption comes carbon build-up on surfaces of the piston, such as the top land area, including in the annular ring grooves. As such, the ring movements can be restricted by the carbon build-up, thereby resulting in oil blow-by, reduced engine performance, reduced engine component life, and increased oil consumption and emission. As such, there are continual efforts being made to overcome the drawbacks brought about by carbon build-up within a cylinder bore and on the pistons within the cylinder bore.

A piston manufactured according to the present invention and engine therewith overcomes or greatly minimizes the drawbacks resulting from carbon build-up discussed above, thereby allowing diesel engines to operate at an increased performance level, while reducing their oil consumption and exhaust emissions, and improving their useful life.

SUMMARY OF THE INVENTION

A piston for an internal combustion engine manufactured in accordance with the present invention reduces carbon build-up on a top land of the piston, reduces carbon build-up in ring grooves and on piston rings with the grooves, improves the movement of the piston rings, reduces oil blow-by and consumption, reduces bore polishing typically caused by carbon build-up, reduces exhaust emissions, and overall improves the running performance of the engine.

A piston for an internal combustion engine in accordance with one aspect of the invention has a piston body with an upper crown having a substantially cylindrical outer surface depending from a top surface along a central axis. At least one annular ring groove extends radially into the outer surface to provide a top land extending from the ring groove to the top surface. A plurality of waves are formed circumferentially about the top land. Each of the waves has a valley extending radially into the outer surface of the top land and extending from the top surface to the ring groove. The waves traverse from the top surface to the ring groove in non-parallel relation to the axis, wherein the waves are configured in substantially non-overlapping relation with one another in a direction parallel to the axis.

In accordance with another aspect of the invention, an engine has a cylinder block with a cylinder bore and a fuel injector configured to inject fuel spray streams in a predetermined pattern into the cylinder bore. The engine further includes a piston received in the cylinder bore. The piston has a top surface and a peripheral outer surface depending from the top surface along a central axis with at least one annular ring groove extending radially into the outer surface providing a top land extending from the ring groove to the top surface. The top land has a plurality of waves formed therein. Each of the waves has a valley extending radially into the outer surface of the top land and a peak extending radially outwardly from the valleys. The valleys and peaks extend from the top surface to the ring groove. The piston further has a pair of pin bores aligned with one another along a pin bore axis with a thrust direction being provided substantially perpendicular to the pin bore axis. The peaks and valleys are configured in a predetermined orientation relative to at least one of the fuel spray streams, the pin bore axis or the thrust direction.

Yet another aspect of the invention includes a method of constructing a piston configured for reciprocation in a cylinder bore of an internal combustion engine having a fuel injector for injecting a fuel spray stream into the cylinder bore. The method includes providing a piston body having a top surface and an outer surface depending from the top surface along a central axis. Then, forming an annular ring groove extending radially into the outer surface providing a top land extending from the ring groove to the top surface. Further, forming a pair of laterally spaced pin bores aligned with one another along a pin bore axis with a thrust axis being established substantially perpendicular to the pin bore axis. Further yet, forming a plurality of waves in the top land, with the waves having valleys extending radially into the outer surface of the top land and peaks extending radially outwardly from the valleys. And further, configuring the peaks and valleys in a predetermined orientation relative to at least one of the fuel spray stream, the pin bore axis or the thrust axis.

BRIEF DESCRIPTION OF THE DRAWINGS

These and other aspects, features and advantages will become readily apparent to those skilled in the art in view of the following detailed description of presently preferred embodiments and best mode, appended claims, and accompanying drawings, in which:

DETAILED DESCRIPTION OF PRESENTLY PREFERRED EMBODIMENTS

Figure 1A:
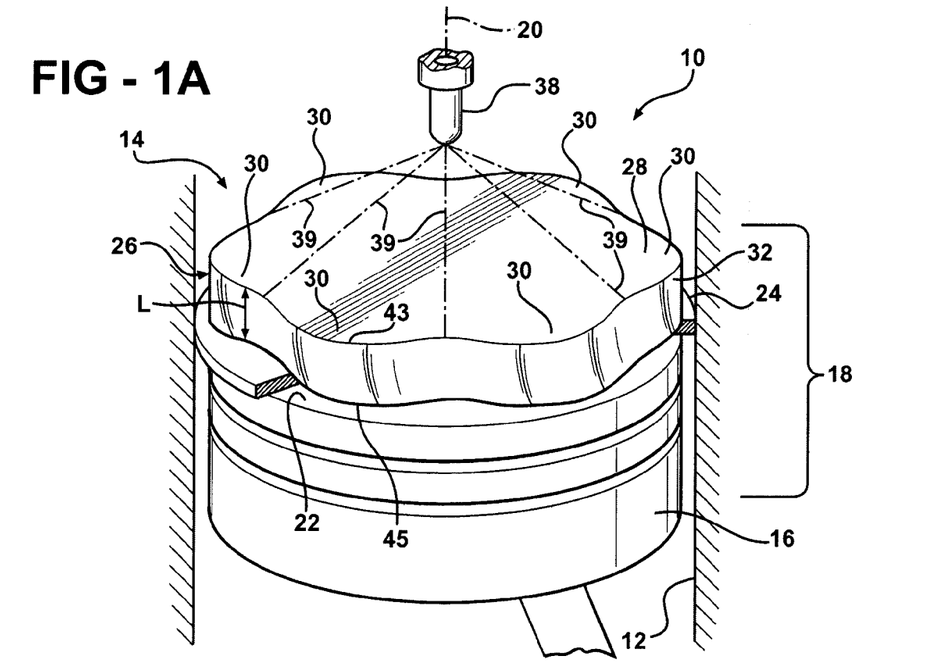
FIGS. 1A-1C are schematic perspective side views of an engine cylinder block with a portion removed showing a three different piston constructions according to presently preferred embodiments of the invention.
Figure 1B:
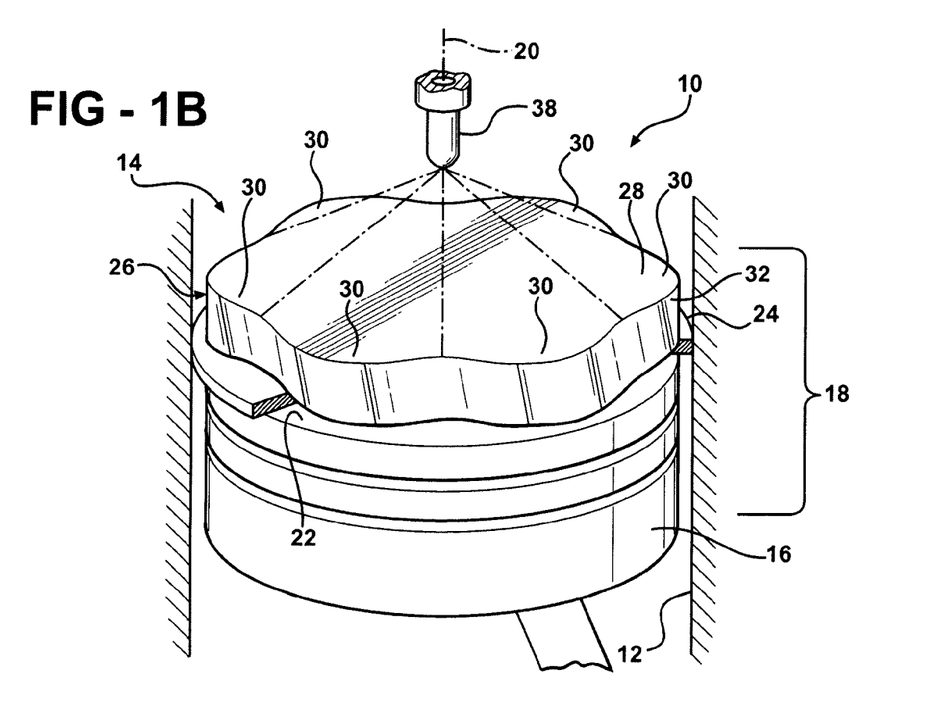
Figure 1C:
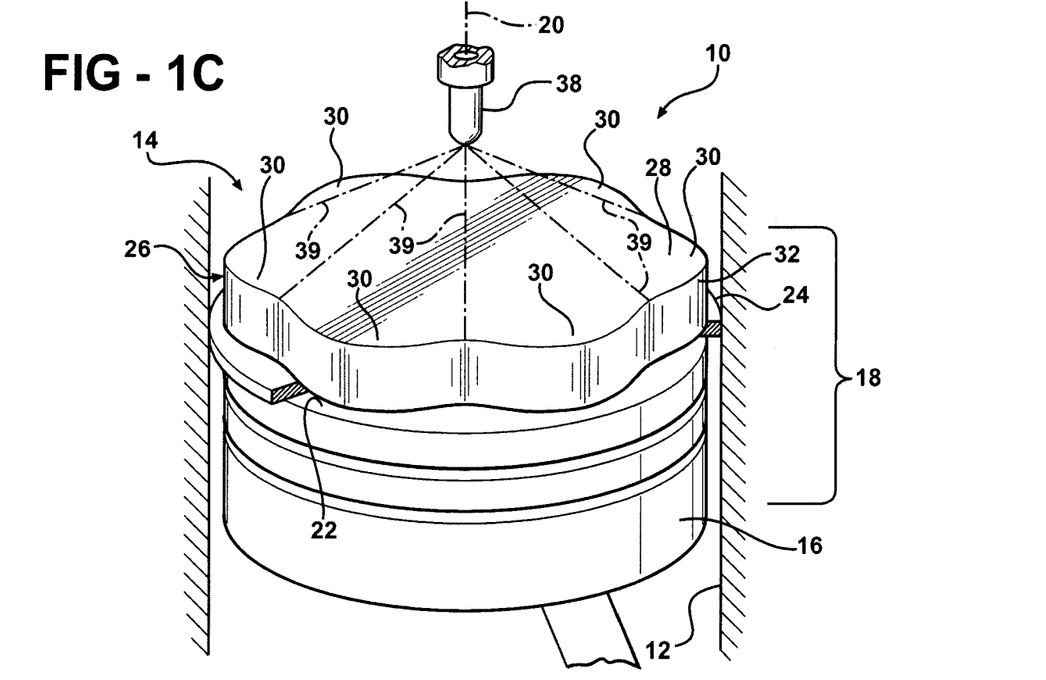

Referring in more detail to the drawings, FIGS. 1A-1C illustrate a piston 10 constructed according to one presently preferred embodiment of the invention. The piston 10 is disposed in a cylinder bore 12 of an internal combustion engine, such as a diesel engine represented generally at 14. The piston 10 has a piston body 16, either cast or forged, with a substantially cylindrical upper crown 18 extending along a central axis 20. The upper crown 20 is formed with at least one annular ring groove 22 for floating receipt of a piston ring, wherein a top upper most piston ring 24 (shown fragmented for clarity) facilitates guiding the piston 10 during reciprocation, while also acting to inhibit the passage of oil upwardly from below the piston body 16. The upper crown 18 has a top land 26 extending upwardly from the upper most ring groove 22 to a compression or top surface 28 of the piston body 16. The top land 26 has a plurality of waves 30 extending axially generally along the direction of the central axis 20. The waves 30, as discussed in more detail hereafter, can be formed having a variety of shapes, sizes and depths, as desired for the intended application, to improve, for example, the engine running performance, the engine oil consumption and emissions, and its useful life.

Figure 2:
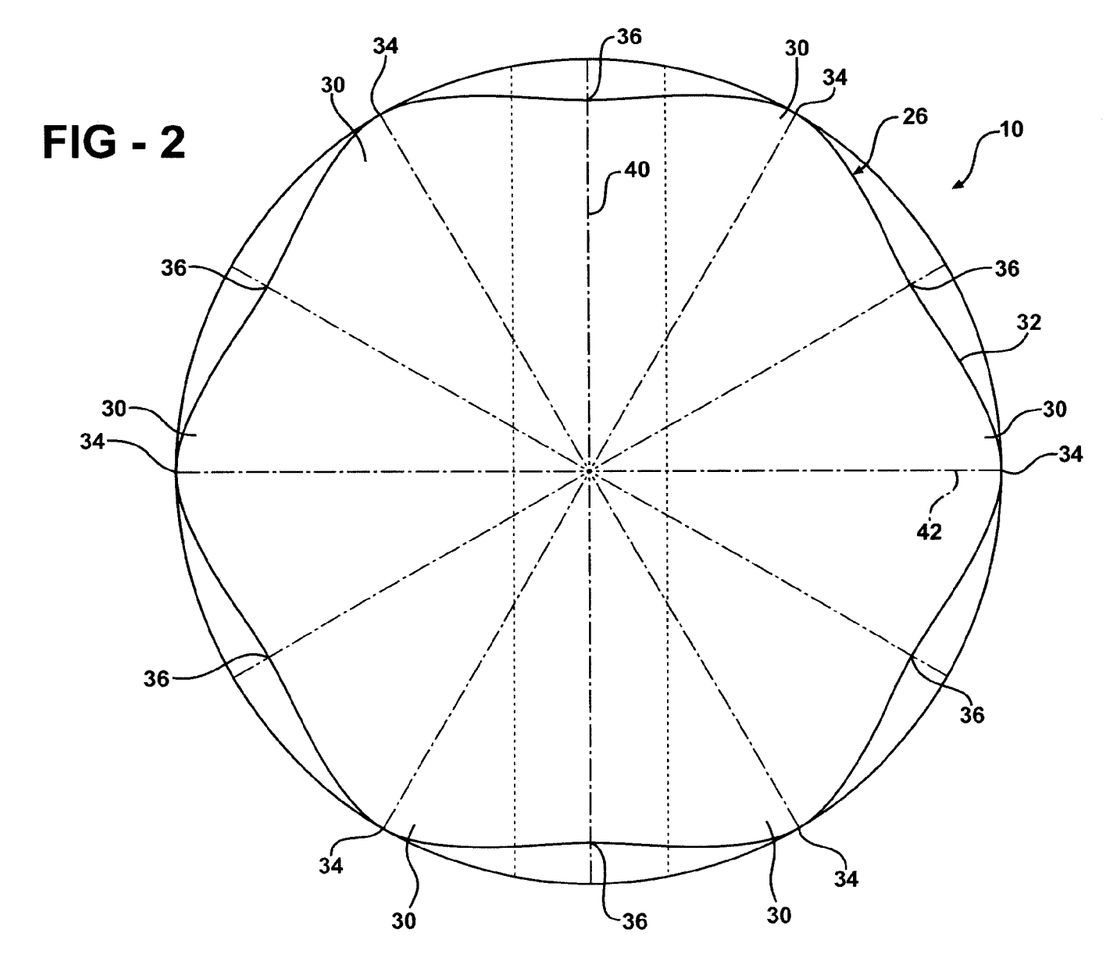
FIG. 2 is a schematic fragmentary top view showing a 180 degree segment of the circumference of the pistons of FIGS. 1-3 with a plurality of axially extending grooves formed in a top land of the piston in accordance with one presently preferred embodiment.

The waves 30 are preferably formed in uniform, symmetrical distribution about an outer surface 32 of the top land 26, although non-uniform arrangements are contemplated to be within the scope of the invention. As shown in FIG. 2, the waves 30 are formed, by way of example and without limitation, to provide six equally distributed peaks 34 between valleys 36 of the waves 30, and can be formed in a sinusoidal pattern about the outer surface 32, or otherwise, as desired. As such, the waves 30 can be formed having a smooth wave form, thereby providing a continuously smooth circumferential surface without providing any sharp edges or stepped surfaces circumferentially about the top land 26. The peaks 34 of the waves 30 are represented here, by way of example, as extending generally flush with and corresponding to an outer maximum diameter of the outer surface 32 of the top land, whereas the valleys 36 of the waves 30 extend radially inwardly from the outer surface 32 to a predetermined depth. The depth can be varied as desired. For example, as illustrated in FIG. 2, the depth of the valleys can be from about 0.5 to 2.0 mm, and thus, the range of the peaks 34 and valleys 36 extends from about a 0.0 mm depth at the outer surface 32 of the top land 26 to about a 0.5 to 2.0 mm depth of the valleys 36.

Figure 3:
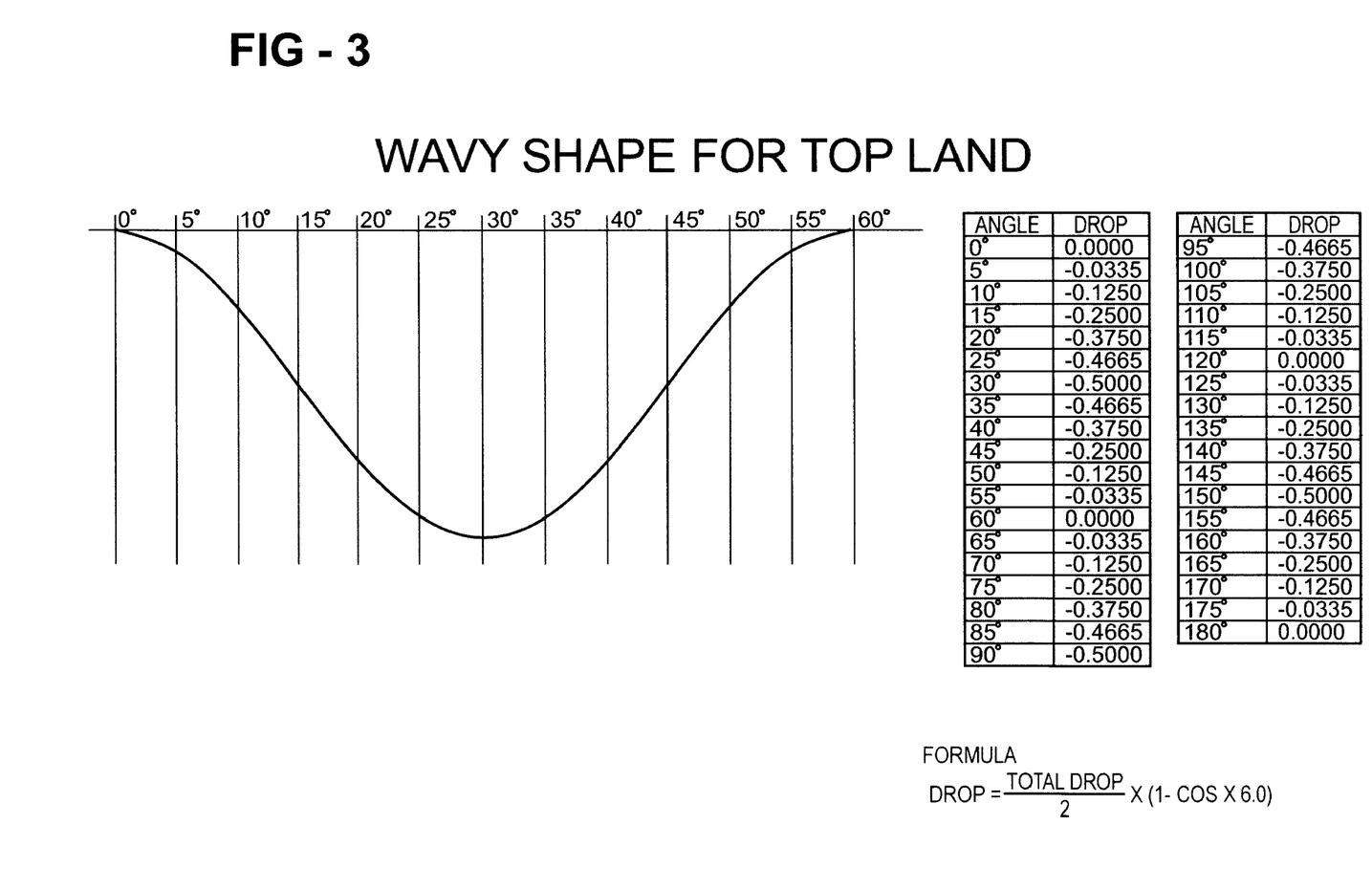
FIG. 3 is a graph and corresponding chart illustrating the contour and depth of the grooves over a portion of the circumference of the top land of the pistons of FIGS. 1A-1C.

The depth of the waves 30 at any circumferential location of the contour, if sinusoidal, can be provided, as illustrated in FIG. 3, by the following formula: depth=(maximum depth/2)×[(1−Cos×number of peaks×angle in degrees)]. So, to utilize the formula, a 0-360 degree reference about the circumference of the top land 26 needs to first be established. Then, to find the depth of the sinusoidal wave 30 at any location about the outer surface 32 of the top land 26, the predetermined maximum depth (e.g. 0.05 mm) needs to be input to the formula; then the Cosine of the number of desired peaks (e.g. 6) times the angle in degrees needs to be input to the formula. With this, the depth of the sinusoidal wave at the selected angular location can be determined.

Figure 4:
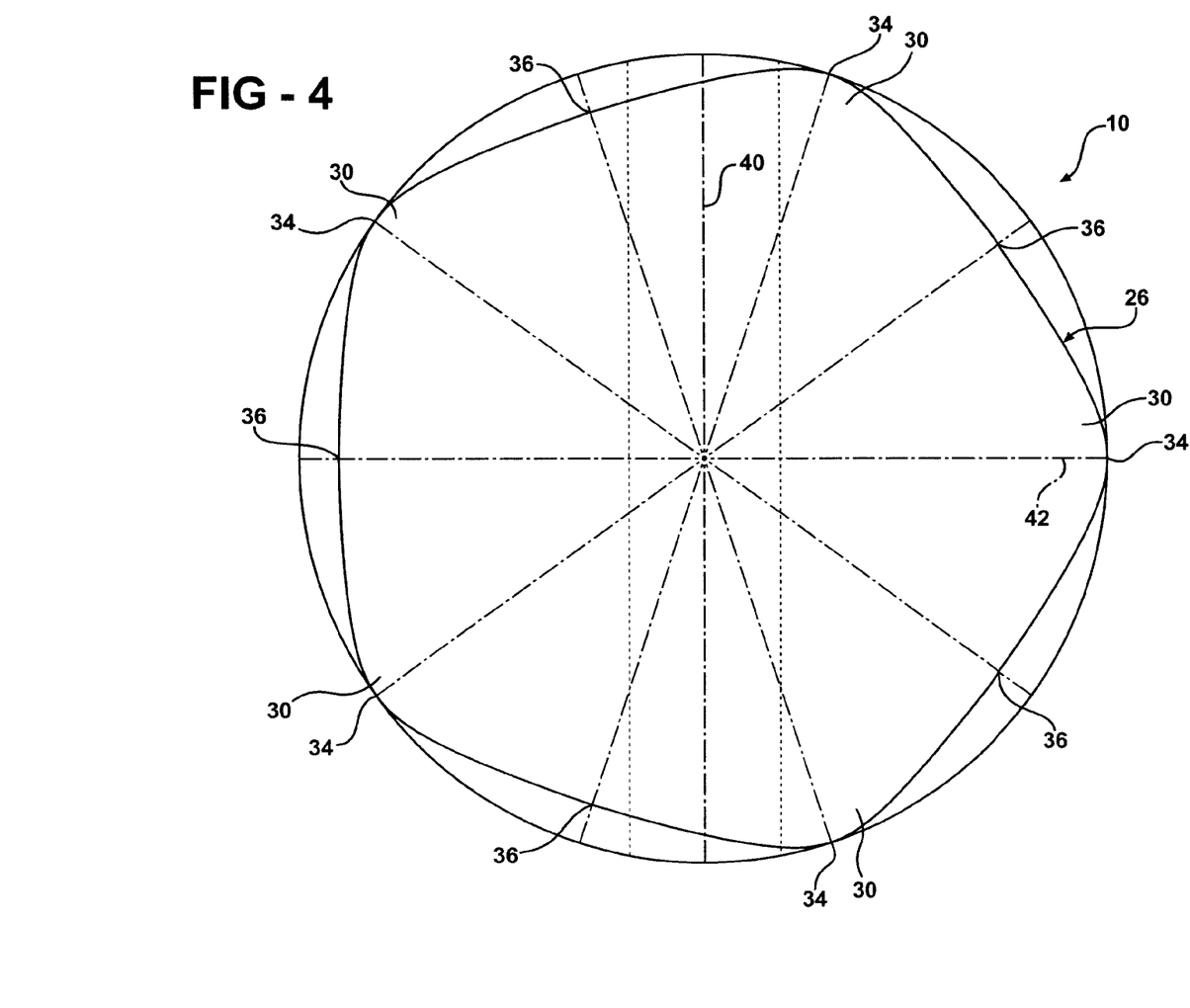
FIG. 4 is a schematic fragmentary top view showing a 180 degree segment of the circumference of a piston with a plurality of axially extending grooves formed in a top land of the piston in accordance with another presently preferred embodiment.
Figure 5:
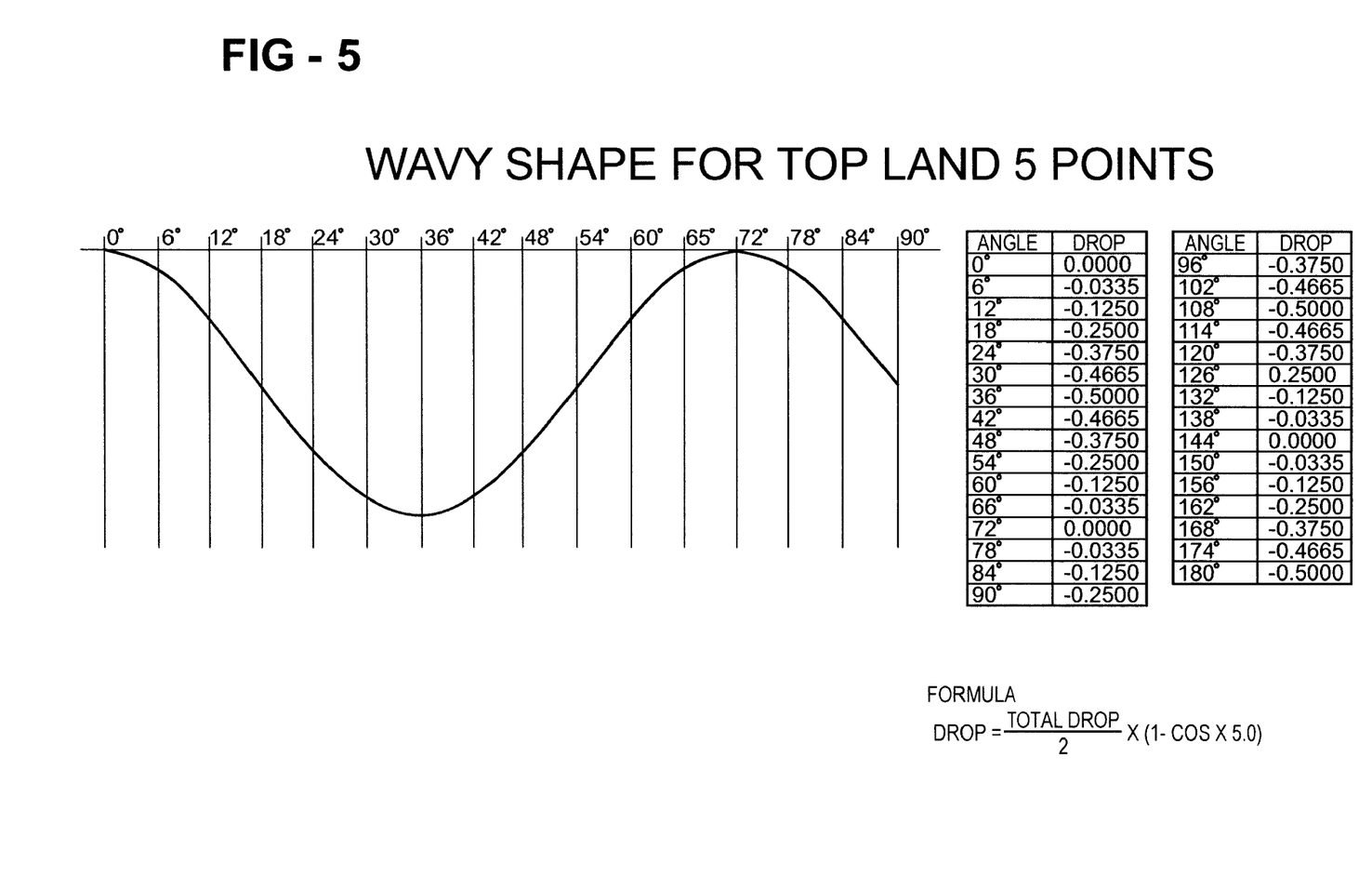
FIG. 5 is a graph and corresponding chart illustrating the contour and depth of the grooves over a portion of the circumference of the top land of the piston of FIG. 6.
Figure 7:
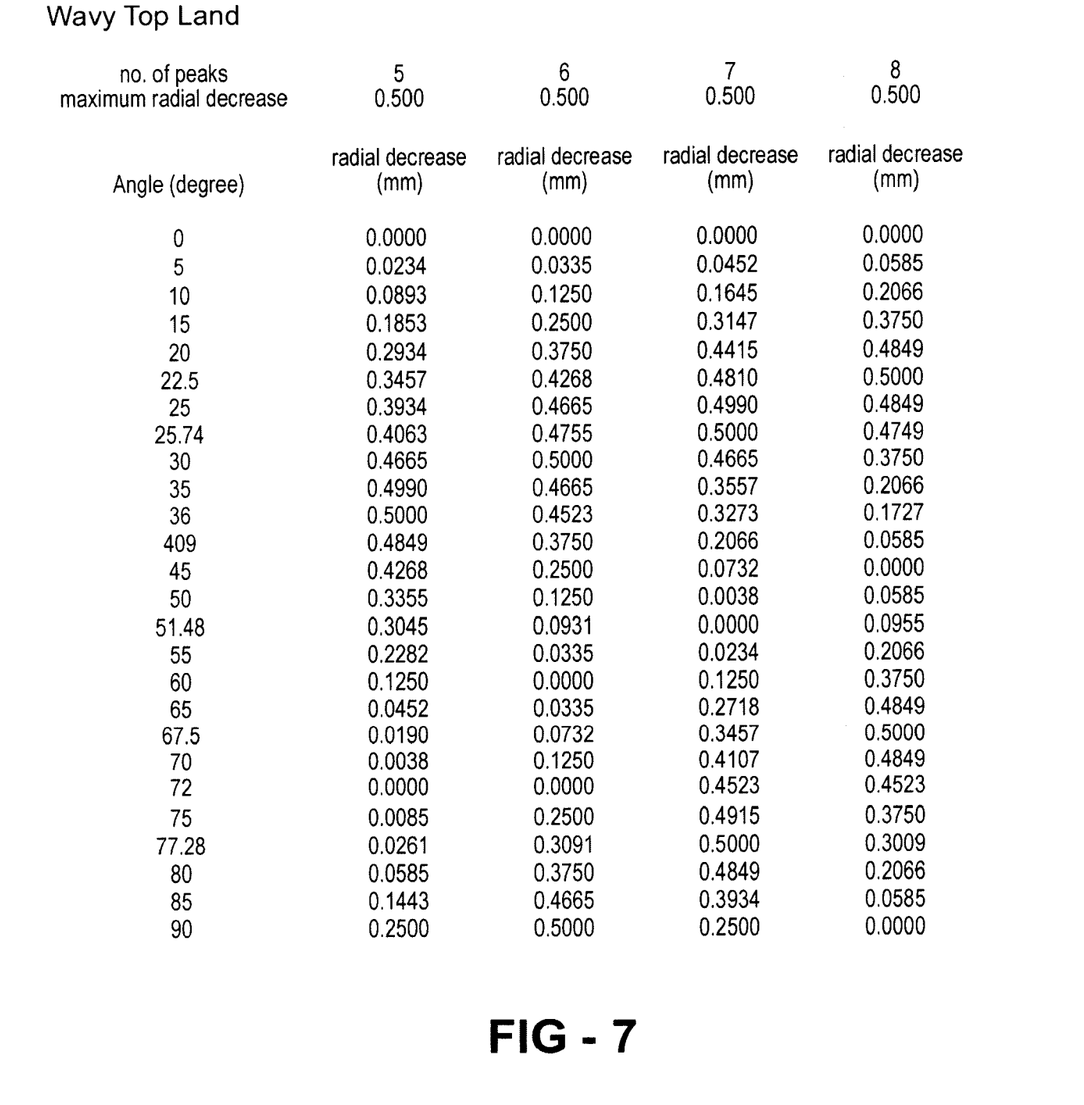
FIG. 7 is a chart indicating the relative depths of grooves of additional pistons over a 90 degree segment of the circumference of the top land constructed in accordance with additional presently preferred embodiments.

As shown in FIG. 4, the piston 10 can be constructed having a different number of waves than described above, such as five waves 30, for example. the waves 30 are constructed generally same as described above, with the peaks 34 and valleys 36 being distributed uniformly about the circumference of the top land 26, as represented by way of example in FIG. 5. Accordingly, it should be recognized that depending on the application, the number of waves 30 can be varied, as further evidenced by a chart in FIG. 7, wherein pistons having 7 and 8 peaks are contemplated.

As illustrated in FIG. 1A, the waves 30 can be formed in a non-linear and helical relation to the central axis 20, wherein an upper end, referred to hereafter as top portion 43, of each wave has a radial or polar shift relative to a lower end, referred to hereafter as bottom portion 45, of the wave 30. Otherwise, as shown in FIG. 1B, the grooves 30 can be formed in a linear and spiral configuration relative to the central axis 20. Further, as shown in FIG. 1C, the grooves 30 can be formed in a linear and parallel relation to the central axis 20, such that the peaks 34 and valleys 36 extend generally vertically in parallel relation to one another. The radial or polar shift of the waves 30 between a top and bottom portion 43, 45, respectively, across the top land 26 can be shifted between about 5 to 30 degrees, for example, wherein the piston 10 is constructed having 6 waves configured for cooperation with 6 fuel spray steams 39. Accordingly, in this case, the peak 34 of each wave 30 will be radially shifted as it extends from the top portion 43 to the bottom portion 45. As such, it should be recognized that the grooves 30 can be formed in a variety of configurations. For example, the depth of the grooves 30 can be formed having a variable depth along the length of the grooves 30 over the axial length (L) (FIG. 1) of the top land 26, if desired. For example, the grooves 30 could have a maximum depth at the top surface 28 of the top land 26 and taper gradually to a decreased depth as the grooves 30 extend toward the ring grooves 22.

Figure 6:
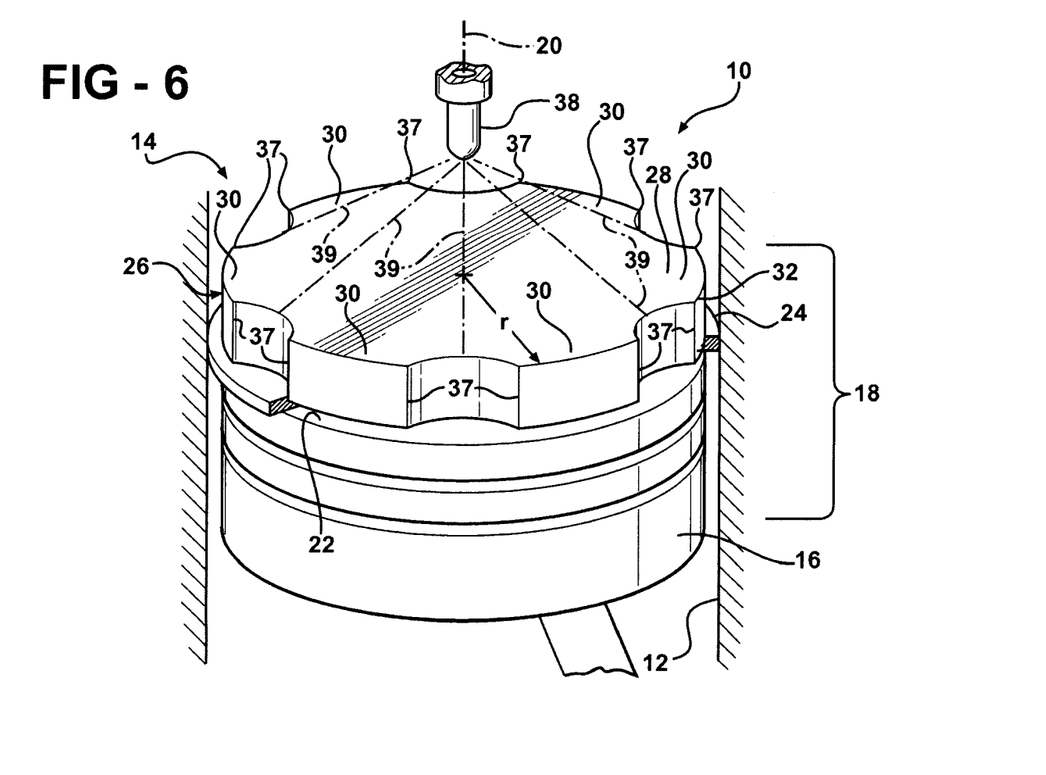
FIG. 6 is a side view of a piston constructed in accordance with another presently preferred embodiment.

As shown in FIG. 6, another embodiment of a piston 10 constructed in accordance with the invention is shown. Rather than having the smooth and continuously varying waves 30 about the outer surface 32, the waves 30 are formed as channels or grooves extending radially inwardly from the outer surface 32 of the top land 26 in radially spaced relation to one another. The waves, also referred to as grooves 30, can be formed generally as described above, being configured vertically, or in a non-linear and helical form, or in a linear and spiral form. The portion of the outer surface 32 of the top land 26 not having the grooves 30 formed therein maintains a generally cylindrical curvature having a constant radius (r) from the central axis 20, wherein the grooves 30 extend radially inwardly therefrom in their radially spaced relation from one another. As such, generally sharp corners or edges 37 are established at the location of transition between the grooves 30 and the outer surface 32.

The waves 30 of the pistons 10 can be configured to present the peaks 34 and the valleys 36 at a predetermined radial location within the cylinder bore 12 upon being installed therein. Accordingly, the peaks 34 and valleys 36 can be configured for a predetermined orientation within the cylinder bore 12, thereby being oriented relative to the fuel spray streams 39, as desired. For example, the peaks 34 could be configured so that the predetermined location of fuel spray streams 39 from a fuel injector jet nozzle or nozzles 38 directs the fuel spray substantially over and into the valleys 36, and thus, between adjacent peaks 34. Of course, it is contemplated that the fuel spray streams 39 could be directed otherwise, such that the fuel spray streams 39 could impinge upon the peaks 34, or both the peaks 34 and valleys 36, as desired for the intended application. As shown in FIG. 2, by way of example and without limitation, where an even number of peaks 34 and valleys 36 are utilized, the peaks 34 or valleys 36 can be arranged to be aligned with a wrist pin axis corresponding to a pin bore axis 40, with the embodiment shown having diametrically opposite valleys 36 centrally aligned along the wrist pin and pin bore axes 40, thereby being bisected by the axis 40. Accordingly, the peaks 34 in this embodiment are aligned along a thrust axis 42 that is generally perpendicular to the wrist pin axis 40. Otherwise, as shown in FIG. 4, where an odd number of peaks 34 and valleys 36 is utilized, one peak 34 can be arranged in alignment along the thrust axis 42, with a diametrically opposite valley 36 being arranged in alignment along an anti-thrust direction collinear with the thrust axis 42 such that the opposite valley 36 is bisected by the thrust axis 42. Meanwhile, along the wrist pin axis 40, the diametrically opposite peaks 34 and valleys 36 can be offset with the axis 40.

It is to be understood that other embodiments of the invention, other than those specifically illustrated in the drawings or discussed above, which accomplish the same function, are contemplated and incorporated herein within the scope of any ultimately allowed patent claims.

What is claimed is:

1. A piston for an internal combustion engine, comprising:
    a piston body having an upper crown with a substantially cylindrical outer surface depending from a top surface along a central axis, at least one annular ring groove extending radially into said outer surface providing a top land extending from said ring groove to said top surface; and
    a plurality of waves formed circumferentially about said top land, each of said waves having a valley extending radially into said outer surface of said top land and extending from said top surface to said ring groove, said waves traversing from said top surface to said ring groove in non-parallel relation to said axis, wherein said waves extend from an upper end at said top surface to a lower end at said ring groove, said upper end of one of said waves being in non-overlapping relation to said bottom end of an adjacent one of said waves.

2. The piston of claim 1 wherein said upper ends of said waves are configured relative to a fuel spray pattern.

3. The piston of claim 2 wherein said valleys are configured receive direct spray from the fuel spray pattern.

4. The piston of claim 1 wherein said piston has a pair of pin bores aligned with one another along a pin bore axis and said upper ends of said waves being arranged relative to said pin bore axis.

5. The piston of claim 4 wherein said waves have peaks extending outwardly to said outer surface, one of said peaks being arranged along a thrust direction substantially perpendicular to said pin bore axis.

6. The piston of claim 4 wherein one of said valleys is aligned along said pin bore axis.

7. The piston of claim 1 wherein said waves extend in a helical pattern relative to said central axis.

8. The piston of claim 1 wherein said waves extend in a spiral pattern relative to said central axis.

9. The piston of claim 1 wherein said valleys have a variable depth between said top surface and said ring groove.

10. A piston for an internal combustion engine, comprising:
    a piston body having an upper crown with a substantially cylindrical outer surface depending from a top surface along a central axis, at least one annular ring groove extending radially into said outer surface providing a top land extending from said ring groove to said top surface; and
    a plurality of waves formed circumferentially about said top land, each of said waves having a valley extending radially into said outer surface of said top land and extending from said top surface to said ring groove, said waves traversing from said top surface to said ring groove in non-parallel relation to said axis,
wherein said waves and said outer surface of said top land provide a smooth sinusoidal form circumferentially about said top land.

11. An engine, comprising:
    a cylinder block having a cylinder bore;
    a fuel injector configured to inject fuel spray streams in a predetermined pattern into said cylinder bore; and
    a piston received in said cylinder bore, said piston having a top surface and a peripheral outer surface depending from said top surface along a central axis with at least one annular ring groove extending radially into said outer surface providing a top land extending from said ring groove to said top surface, said top land having a plurality of waves formed therein, each of said waves having a valley extending radially into said outer surface of said top land and a peak extending radially outwardly from said valleys, said valleys and peaks extending from said top surface to said ring groove, said piston further having a pair of pin bores aligned with one another along a pin bore axis with a thrust direction being provided substantially perpendicular to said pin bore axis, and wherein said peaks and valleys are configured in a predetermined orientation relative to at least one of said fuel spray streams, said pin bore axis or said thrust direction, wherein said waves extend from an upper end at said top surface to a lower end at said ring groove, said upper end of one of said waves being in non-overlapping relation to said bottom end of an adjacent one of said waves.

12. The engine of claim 11 wherein said valleys are oriented to receive said fuel spray streams directly therein.

13. The engine of claim 11 wherein one of said peaks is oriented at said top surface along said thrust direction.

14. The engine of claim 11 wherein a pair of diametrically opposite valleys are oriented along said pin bore axis.

15. The engine of claim 11 wherein said waves extend in a helical pattern relative to said central axis.

16. The engine of claim 11 wherein said waves extend in a spiral pattern relative to said central axis.

17. The engine of claim 11 wherein said waves extend in non-parallel relation to said central axis.

18. The engine of claim 11 wherein said valleys have a variable depth between said top surface and said ring groove.

19. An engine, comprising:
    a cylinder block having a cylinder bore;
    a fuel injector configured to inject fuel spray streams in a predetermined pattern into said cylinder bore; and
    a piston received in said cylinder bore, said piston having a top surface and a peripheral outer surface depending from said top surface along a central axis with at least one annular ring groove extending radially into said outer surface providing a top land extending from said ring groove to said top surface, said top land having a plurality of waves formed therein, each of said waves having a valley extending radially into said outer surface of said top land and a peak extending radially outwardly from said valleys, said valleys and peaks extending from said top surface to said ring groove, said piston further having a pair of pin bores aligned with one another along a pin bore axis with a thrust direction being provided substantially perpendicular to said pin bore axis, and wherein said peaks and valleys are configured in a predetermined orientation relative to at least one of said fuel spray streams, said pin bore axis or said thrust direction, wherein said waves extend substantially parallel to said central axis.

20. An engine, comprising:
   a cylinder block having a cylinder bore;
   a fuel injector configured to inject fuel spray streams in a predetermined pattern into said cylinder bore; and
   a piston received in said cylinder bore, said piston having a top surface and a peripheral outer surface depending from said top surface along a central axis with at least one annular ring groove extending radially into said outer surface providing a top land extending from said ring groove to said top surface, said top land having a plurality of waves formed therein, each of said waves having a valley extending radially into said outer surface of said top land and a peak extending radially outwardly from said valleys, said valleys and peaks extending from said top surface to said ring groove, said piston further having a pair of pin bores aligned with one another along a pin bore axis with a thrust direction being provided substantially perpendicular to said pin bore axis, and wherein said peaks and valleys are configured in a predetermined orientation relative to at least one of said fuel spray streams, said pin bore axis or said thrust direction, wherein said waves provide a smooth, non-stepped surface circumferentially about said top land.

21. A method for constructing a piston configured for reciprocation in a cylinder bore of an internal combustion engine having a fuel injector for injecting a fuel spray stream into the cylinder bore, comprising:
   providing a piston body having a top surface and an outer surface depending from the top surface along a central axis;
   forming an annular ring groove extending radially into the outer surface providing a top land extending from the ring groove to the top surface;
   forming a pair of laterally spaced pin bores aligned with one another along a pin bore axis with a thrust axis established substantially perpendicular to the pin bore axis;
   forming a plurality of waves in the top land, the waves having valleys extending radially into the outer surface of the top land and peaks extending radially outwardly from the valleys and configuring the peaks and valleys in a predetermined orientation relative to at least one of the fuel spray stream, the pin bore axis or the thrust axis; and
   further including forming the waves having an upper end at the top surface and a lower end at the ring groove with the upper ends being in non-overlapping relation to the adjacent bottom ends.

22. The method of claim 21 further including configuring the valleys to receive fuel spray streams directly therein.

23. The method of claim 21 further including configuring one of the peaks for orientation at the top surface along the thrust axis.

24. The method of claim 21 further including configuring diametrically opposite valleys for orientation along the pin bore axis.

25. The method of claim 21 further including forming the waves in a helical pattern relative to the central axis.

26. The method of claim 21 further including forming the waves to extend in non-parallel relation to the central axis.

27. The method of claim 21 further including forming the valleys having a variable depth between the top surface and the ring groove.

28. A method for constructing a piston configured for reciprocation in a cylinder bore of an internal combustion engine having a fuel injector for injecting a fuel spray stream into the cylinder bore, comprising:
   providing a piston body having a top surface and an outer surface depending from the top surface along a central axis;
   forming an annular ring groove extending radially into the outer surface providing a top land extending from the ring groove to the top surface;
   forming a pair of laterally spaced pin bores aligned with one another along a pin bore axis with a thrust axis established substantially perpendicular to the pin bore axis;
   forming a plurality of waves in the top land, the waves having valleys extending radially into the outer surface of the top land and peaks extending radially outwardly from the valleys and configuring the peaks and valleys in a predetermined orientation relative to at least one of the fuel spray stream, the pin bore axis or the thrust axis; and
   further including forming the waves to extend substantially parallel to the central axis.

29. A method for constructing a piston configured for reciprocation in a cylinder bore of an internal combustion engine having a fuel injector for injecting a fuel spray stream into the cylinder bore, comprising:
   providing a piston body having a top surface and an outer surface depending from the top surface along a central axis;
   forming an annular ring groove extending radially into the outer surface providing a top land extending from the ring groove to the top surface;
   forming a pair of laterally spaced pin bores aligned with one another along a pin bore axis with a thrust axis established substantially perpendicular to the pin bore axis;
   forming a plurality of waves in the top land, the waves having valleys extending radially into the outer surface of the top land and peaks extending radially outwardly from the valleys and configuring the peaks and valleys in a predetermined orientation relative to at least one of the fuel spray stream, the pin bore axis or the thrust axis; and
   further including forming the waves having a smooth, non-stepped surface circumferentially about said top land.

* * * * *